United States Patent [19]

Glomb et al.

[11] Patent Number: 5,255,581
[45] Date of Patent: Oct. 26, 1993

[54] PEELING MACHINE

[75] Inventors: Reiner Glomb, Velbert; Peter Maresch; Ralf Wagner, both of Solingen, all of Fed. Rep. of Germany

[73] Assignee: TH. Kieserling & Albrecht GmbH & Co., Solingen, Fed. Rep. of Germany

[21] Appl. No.: 716,650

[22] Filed: Jun. 17, 1991

[30] Foreign Application Priority Data

Jun. 16, 1990 [DE] Fed. Rep. of Germany ....... 4019286

[51] Int. Cl.⁵ ............................................. B23B 5/12
[52] U.S. Cl. ................................ 82/130; 29/81.11; 82/131
[58] Field of Search ............ 82/130, 137, 129, 127, 82/101, 113, 142, 147, 19, 73, 92, 1.11; 408/203.5; 409/132, 157, 195, 225, 259; 29/81.11; 229/131; 414/14; 51/80 A; 226/176, 177, 181

[56] References Cited

U.S. PATENT DOCUMENTS

| 2,655,066 | 10/1953 | Siegerist | 82/130 |
| 3,750,497 | 8/1973 | Goeke et al. | 82/130 |
| 3,817,130 | 6/1974 | Goeke | 82/130 |
| 4,295,397 | 10/1981 | Schweer | 82/130 |

FOREIGN PATENT DOCUMENTS

| C00116 | 9/1956 | Fed. Rep. of Germany | 82/130 |
| 1121903 DE-PS | 1/1962 | Fed. Rep. of Germany | 82/130 |
| 1074360 | 12/1968 | Fed. Rep. of Germany | . |
| 2849567 | 7/1982 | Fed. Rep. of Germany | . |
| 722765 | 1/1955 | United Kingdom | 226/181 |

Primary Examiner—Z. R. Bilinsky
Attorney, Agent, or Firm—Horst M. Kasper

[57] ABSTRACT

A peeling machine (1) includes individual device groups (2, 5, 63, 7) which can be centered and clamped at guide rails (23, 24). The guide rails also furnish a particular sliding possibility for a selective moving apart of individual device groups (2, 5, 63). This allows for maintenance, inspection, and repair of the device groups, which are made accessible by moving the individual device groups apart without any heavy equipment. The device groups, which are not to be separated during the pulling apart of the peeling machine at the guide rails, are connected to each other (64, 65) such that the peeling machine can be separated and subdivided at the desired location. The guide rails extend parallel to the rotation axis (62) of the cutter head (26) of the peeling machine and can be quickly bolted and released.

24 Claims, 3 Drawing Sheets

PEELING MACHINE

BACKGROUND OF THE INVENTION

1. Field of the Invention

The invention relates to a peeling machine for bars and tubes which includes an infeed aggregate on the infeed side of the peeling machine, a rotating cutter head, where the cutter head is formed on the front face of the infeed side at a hollow shaft, rotatably supported in the machine frame, and means for withdrawing of finished, peeled, workpiece from the peeling machine.

2. Brief Description of the Background of the Invention Including Prior Art

Peeling machines of this kind serve, in most cases, for producing so-called bright steel from a hot-rolled metallic round stock. The bar-shaped round stock is peeled at its cylindrical periphery by a rotating cutter head. The bar itself is led through the peeling machine secured in an axial direction against undesired rotation by a central bore in the cutter head. The rotating cutter head carries three or more inwardly directed cutters which peel the bar along a helical path. Such peeling machines are used in connection with wires, bars and tubes. Peeling machines used at this time work with an infeed aggregate on the infeed side in front of the cutter head. The infeed aggregate includes two roller pairs. The peeling machine includes a clamping carriage disposed on the exit side of the cutter head. The clamping carriage secures the bar against rotation and transfers the bar when the last end of the bar is being peeled.

In addition, such peeling machines have guides disposed immediately in front of and behind the cutter head. These guides center the workpiece and damp the vibrations generated by the peeling process.

Present-day peeling machines can change the feed throughput of the material, the rotation speed of the cutter head, and the finished diameter of a peeled bar or of a peeled tube during operation. While the feed throughput speed and the rotation speed of the cutter head can be changed relatively easily by control of the drive motors, the adjustment of the cutters for a diameter adjustment of the finished, peeled bar has to go back to the rotating hollow shaft and has to perform most precise adjustment motions at the rotating hollow shaft.

A plant of several machines for a machining of bars is known from the German Patent DE-PS 2,849,576 where, among others, a peeling machine is taught, where the individual machines can be moved apart for the installation of the tools, and where the machines can be moved back together for operation. It is a disadvantage of the teaching of the German Patent DE-PS 2,849,576 that the accessibility of the individual components of the peeling machine is not taken into consideration or is not taken sufficiently into consideration and that the rigidity of the peeling machine is substantially impaired by the movability and a lack of bracing with regard to the foundation.

SUMMARY OF THE INVENTION

1. Purpose of the Invention

It is an object of the present invention to modify the peeling machine of the prior art such that a good accessibility of individual components of the peeling machine is assured.

It is a further object of the present invention to provide a peeling machine where the machine, in its totality, is formed of a rigid structure composed of easily accessible individual device groups of the peeling machine.

It is yet another object of the present invention to provide a peeling machine which is easily serviced and which provides easy exchangeability of parts subjected to wear.

2. Brief Description of the Invention

According to the present invention there is provided for a peeling machine for round stock such as bars and tubes. A rotating cutter head, defining a rotation axis, is disposed on a front side of a hollow shaft and is disposed rotatable on an infeed side at a machine frame casing. Means are provided for pulling out and withdrawing a finished, peeled workpiece from the machine frame casing. An infeed aggregate represented by an infeed work guide assembly is attached to the machine frame casing and disposed on the infeed side of workpieces of round stock. The infeed aggregate and or second work guide assembly and the machine frame casing are movable relative to each other in a direction of the rotation axis of the hollow shaft. Means are provided for a disengageable and releasable tensioning and clamping together of the infeed aggregate and of the machine frame casing. At least two guide rails or rods are disposed at the machine frame casing. The guide rails extend parallel to the rotation axis of the cutter head.

A feature of the invention is based on the combination of the movability of the peeling-machine device groups, furnished for the adjustment, the maintenance, and the repair, and of the tightening and bracing of the device groups, infeed up to the peeling machine casing for setting up a peeling operation. The tensioning and bracing of the device groups occurs in throughput direction of the workpieces to be peeled. All device groups from the infeed aggregate up to the casing and engaging at the workpiece to be peeled, in which casing the cutter head rotates, are movable and removable along guides and are tensioned axially with respect to a block and are under pressure pretensioned.

The guide rails and the means for the tensioning and clamping of the infeed aggregate and of the machine frame casing can form a single unit. According to a preferred embodiment, the guide rails are furnished as clamping means. The guide rails preferably operate as pretensioned tie rods.

A guide system for the workpieces of round stock to be peeled can be disposed between the infeed aggregate and the cutter head. The guide system can be guided and moved at the guide rails in front of the cutter head.

According to a further embodiment, a guide aggregate which is optionally disposed between the cutter head and the infeed aggregate, is also guided at the guide rails and is positioned and clamped between the peeling machine casing and the infeed aggregate.

The guide rails can be disposed about diametrically with respect to the rotation axis of the cutter head. The term "diametrical" is to be understood such that two guide rails with the rotation axis of the cutter head form an angle of between 90° and 270°. The distance of the guide rails from the rotation axis is not very important. The smaller the distance of the rotation axis of a cutter head, the more favorable however is the force flow. A guide rail and a clamping rail is provided in the peripheral region of the peeling machine casing.

A guide system for the workpieces of round stock to be processed can be disposed between the infeed aggregate and the cutter head. A device group for a cutter position adjustment represented by cutter adjustment means relative to the hollow shaft can be guided on said guide rails. A support frame can internally support the device group for the cutter position adjustment. The support frame can be inserted in a direction parallel to the rotation axis of the cutter head into the machine frame casing for the cutter head. The machine frame can surround the cutter head and the hollow shaft carrying the cutter head. The casing of the cutter adjustment is advantageously formed of ring-shape and encloses the rotatably supported hollow shaft. Like the infeed aggregate and an optionally provided front guide, the casing of the cutter adjustment is guided at the guide rails and is attached for the peeling operation at the casing of the peeling machine, where the rotary cutter head is also supported in the peeling machine. After the detachment and disengagement of this attachment, the casing of the cutter adjustment can be pulled from the peeling machine casing axially opposite to the feed throughput direction of the material to be peeled after the remaining device groups, disposed on the feed side in front of the cutter head, have been withdrawn.

A guide system for the workpieces of round stock to be peeled can be disposed between the infeed aggregate and the cutter head. Means for an attachment of the device group can be disposed at the guide system on the infeed side of the cutter head or at the infeed aggregate, respectively. According to this preferred embodiment, additional transfer means become unnecessary for a withdrawal of the device group cutter adjustment from the peeling machine casing. The device groups, provided at the feed side in front of the cutter adjustment, secure the device group "cutter adjustment" against canting at the guide rails.

An additional guide rail can be is disposed parallel to the guide rails. The infeed aggregate can be guided at the additional guide rail. The size and the weight of the infeed aggregate can be supported by the additional rail. A constructive simplification is thereby achieved for the guide rails, at which the infeed apparatus and, possibly, a front guide and further possibly, a device group "cutter adjustment" are guided. This simplification would not be possible without the additional parallel rail for the infeed aggregate with its larger dimensions and its substantially higher weight.

The infeed aggregate is the first one in a series of the device groups, which are also guided at the guide rails. A drive can be disposed at the infeed aggregate for moving the infeed aggregate in the elongation direction of the guide rails. This first device group is furnished with said drive for shifting and sliding the guided device groups in the direction of the guide rails. A guide system can be provided for the workpieces of round stock to be peeled and disposed between the infeed aggregate and the cutter head. Means can be provided for attachment of the guide system to the infeed aggregate. Said means for attachment of the guide system can be disposed on the infeed side in front of the cutter head. Based on a selective coupling of the individual device groups, a desired intermediate space can be furnished between arbitrary neighboring device groups with the drive for the first device group, i.e. usually the infeed aggregate, where such intermediate space is required for maintenance, adjustment, or repair work.

In order to be able to withdraw and remove individual device groups from the side from the guide rail, the device groups are to be subdivided in longitudinal direction. A device group can be guided at the guide rails and can be subdivided in a longitudinal direction defined by the rotation axis of the cutter head. A partition face plane can be disposed between a cover face and the device group intersecting through the guide rails. A longitudinal direction means a plane or a line parallel to at least one of the guide rails.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
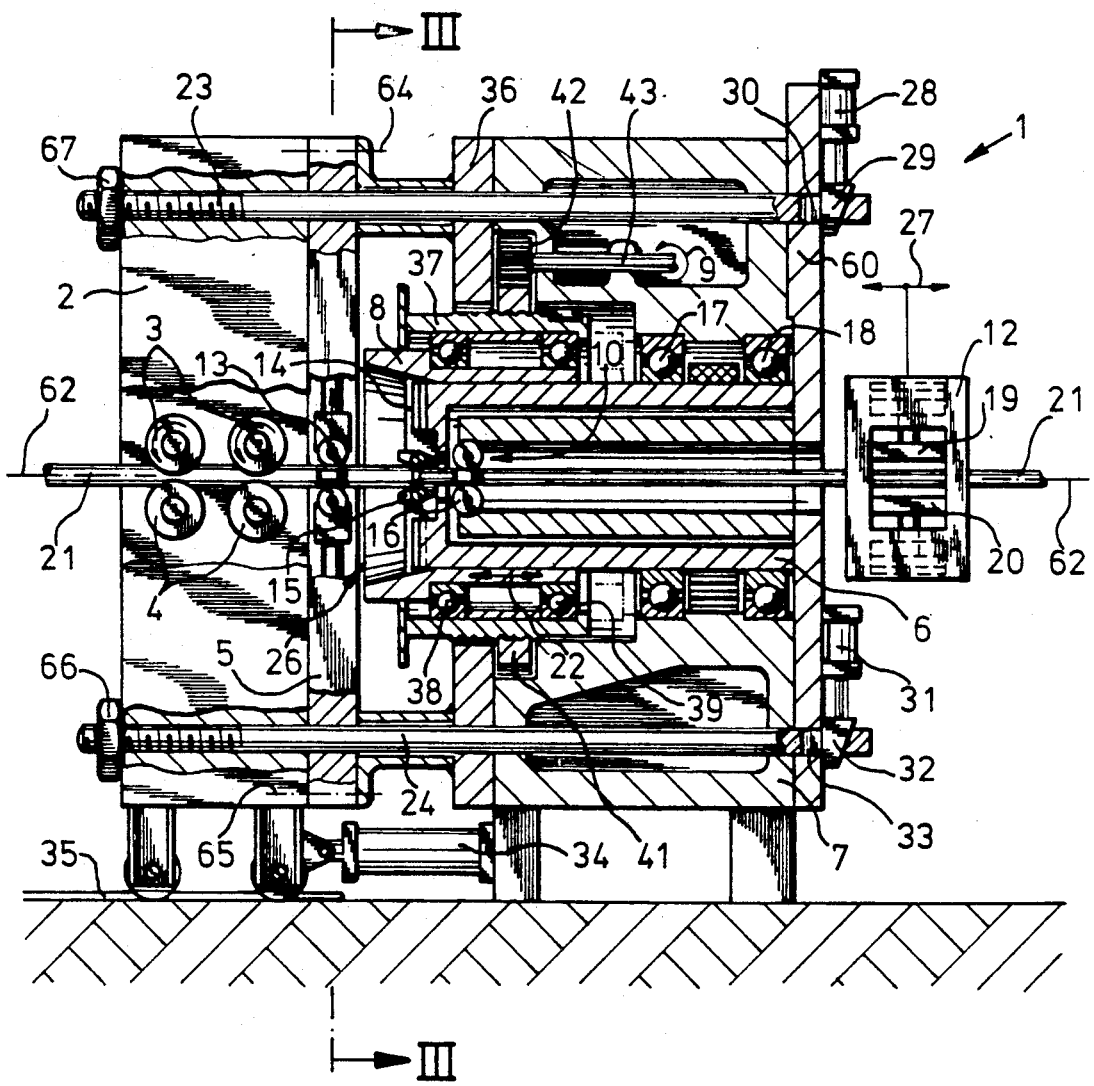
FIG. 1 is a schematic side, and in part sectional view of a peeling machine.

According to the present invention, there is provided for a peeling machine 1 for bars 21 and tubes. An infeed aggregate represented by an infeed work guide assembly 2 is disposed on an infeed side of the peeling machine 1. A rotating cutter head 26 is disposed on a front side of a hollow shaft 6, and is disposed rotatable on the infeed side at a machine frame casing 7. Means 12 are provided for pulling out and withdrawing a finished, peeled workpiece from the peeling machine 1. At least two guide rails or rods 23, 24 are disposed at the casing 7 of the peeling machine 1. The guide rails 23, 24 extend parallel to a rotation axis 62 of the cutter head 26. The infeed aggregate 2 and the peeling machine casing 7 are movable relative to each other in direction of the rotation axis 62 of the hollow shaft 6. Means 23, 28, 29, 64 are provided for a disengageable and releasable clamping of the infeed aggregate 2 and of the peeling machine casing 7.

The guide rails 23, 24 can be a component of the means 23, 28, 29, 64 for the tensioning and clamping of the infeed aggregate 2 and of the peeling machine casing 7.

A guide system 5 can be provided for the bars or tubes to be peeled between the infeed aggregate 2 and the cutter head 26. The guide system 5 can be guided and moved at the guide rails 23, 24 in front of the cutter head 26. The guide rails 23, 24 can be disposed about diametrically with respect to the rotation axis 62 of the cutter head 26.

A guide system can be provided for the bars or tubes to be processed between the infeed aggregate 2 and the cutter head 26. A device group represented by cutter adjustment means 63, forming a cutter adjustment, can be guided on rails 23, 24 at the hollow shaft 6. The device group 63, forming a cutter adjustment, can be incorporated in a support frame 36. This support frame 36 can be inserted in an axial direction 62 into the peeling machine casing 7 for the cutter head 26. Said support frame 36 can surround the cutter head 26 or the hollow shaft 6 carrying the cutter head, respectively.

Means 64, 65 can be furnished for an attachment of the device group 63, forming a cutter adjustment, at the guide system 5 on the infeed side of the cutter head 26 or at the infeed aggregate 2. The infeed aggregate 2 can be guided at at least one additional guide rail 35, disposed parallel to the other guide rails 23, 24.

A drive can be furnished at the infeed aggregate 2 for moving the infeed aggregate 2 in the direction of the guide rails 23, 24.

Means 64, 65 can be furnished for attachment of the guide system 5, disposed on the infeed side in front of the cutter head 26, to the infeed aggregate 2.

At least one device group 5, guided at the guide rails 23, 24, can be subdivided in a longitudinal direction defined by the rotation axis 62. A partition face plane 52 between a cover face and a guide can intersect through the guide rails 23.

FIG. 1 illustrates a bar 21, which bar 21 is to be peeled in a peeling machine 1. The peeling machine comprises an infeed aggregate 2 with transfer rollers 3, 4, where the transfer rollers are rotary driven in a way not illustrated and where the transfer rollers are rotatably supported in the infeed aggregate. A cutter head 26 is disposed at a hollow shaft 6. The hollow shaft 6 is supported for rotary motion in a machine frame casing 7 in a conventional way in bearings 17, 18. A rear guide 10, clamps with its rollers 16 the further progressed fed-in bar at the peeled section. A clamping carriage 12, which can be moved in the direction of arrow 27, secures the bar 21 against rotation with its clamping jaws 19, 20 and pulls the bar 21 out of the peeling machine.

The cutter head 26 is disposed at the infeed front face side of the hollow shaft 6. A tapered sleeve 8 can be shifted in the hollow shaft 6 in throughput direction of the bar 21, as illustrated with an arrow 22 (about middle of FIG. 1) by rotation according to arrow 9 (top third of FIG. 1 or 2) at the drive shaft 43 during rotation of the hollow shaft 6. Several cutter holders are supported internally at the cone taper of the tapered sleeve 8 in a radial direction. The cutter holders 14 are adjusted upon an axial shifting of the tapered sleeve 8 in a radial direction relative to the bar 21. The cutters 15, supported at the cutter holders 14, peel a layer of adjustable thickness from the bar 21 corresponding to the set position of the cutter holders and of the tapered sleeve. The vibrations of the cutting process at the cutter head are damped by the rollers 13 and 16 of the front and rear guide 5 and 10, respectively.

The infeed aggregate 2 secures the bar 21 against rotation under the cutter torque, which torque is transferred into the bar 21 from the cutter head 26. In addition, the infeed aggregate brings and furnishes feed throughput force based on a not illustrated drive of the rollers 3, 4, in order to slide the bar 21 through the cutter head 26.

Figure 2:
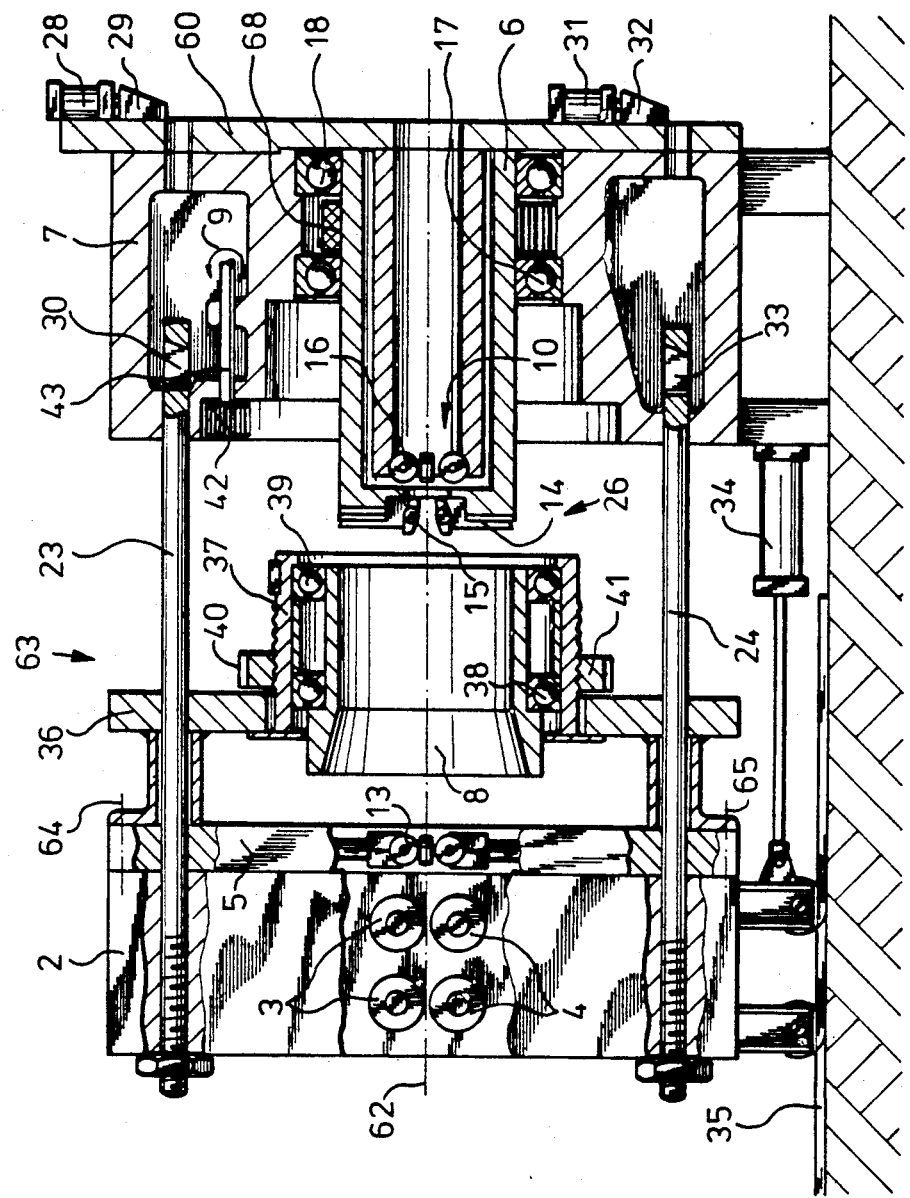
FIG. 2 is a side elevational and in part sectional view of the peeling machine of FIG. 1, according to an exploded view.
Figure 3:
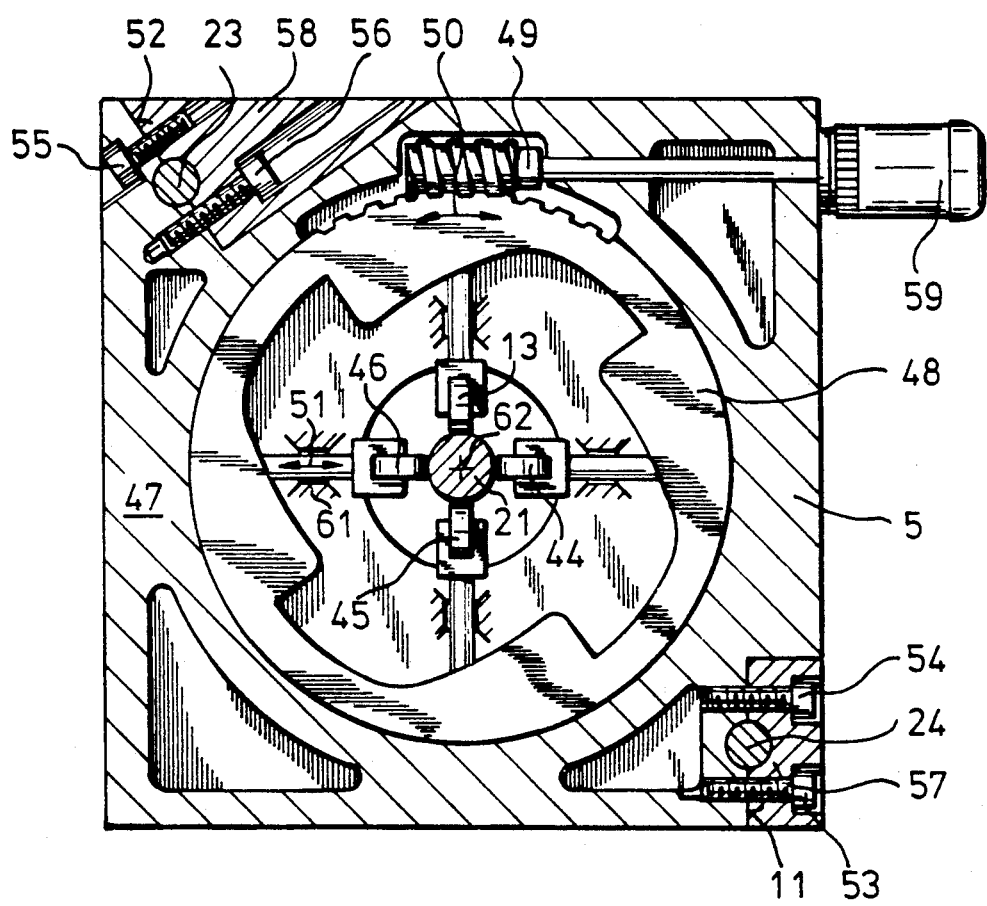
FIG. 3 is a sectional view of the embodiment of FIG. 1 along the section line III—III of FIG. 1.

The cutter adjustment during the rotation of the hollow shaft 6 is furnished by a device group 63, illustrated in FIG. 2. This device group 63 can be moved in the direction of the rotation axis 62 of the cutter head 26 into the peeling machine frame casing 7. This device group 63 of the cutter adjustment includes a support frame 36, which is guided at rails 23, 24, an adjustment shell 37, two tapered sleeve supports 38, 39, the tapered sleeve 8, and an adjustment nut 41, which adjustment nut 41 is screwed onto an outer thread at the said adjustment sleeve 37. The adjustment nut 41 carries at its outside a gear-toothed section 40, which gear-toothed section 40 engages in a contact state of the peeling machine 1 with a gear wheel 42 in the peeling machine frame casing 7, as illustrated in FIG. 1. The gear wheel 42 is driven in a way not illustrated in detail by the drive shaft 43 according to arrow 9 for adjustment of the radial position of the peeling cutter.

The front guide system 5, disposed at the feed side of the cutter head 26, comprises four guide rollers 13, 44, 45, 46, which are disposed like a star around the bar 21 to be peeled and which guide rollers 13, 44, 45, 46 can be adjusted in guides 61 in the direction of the arrow 51 in a radial direction relative to the bar 21. The supports of the rollers 13, 44, 45, 46 are supported toward the outside at a curved ring 48, which curved ring 48 shifts the guide rollers 13, 44, 45, 46, in a radial direction upon pivoting in the direction of the arrow 50. The pivoting of the curved ring 48 is furnished by a servomotor 59, which drives a worm 49, disposed spatially fixed in the casing 47 of the front guide. This worm 49 engages with a toothed section on the curved ring 48.

The front guide system is required only for smaller diameters of the bar 21 and can be removed from the side of the peeling machine. The casing 47 of the guide system 5, supported at the guide rails 23, 24, is subdivided for this purpose. The subdivision is performed with two covers 57, 58, where the abutting plane of the separating grooves 11, 52 of the covers 57, 58 and the face of the casing 47 intersects the guides 23, 24. The screws 53, 54, 55, 56, supporting the cover are screwed out for a lateral pulling out of the front guide system, and the half-shell shaped covers 57, 58 are removed. Then, the complete front guide 5 can be pivoted and can be removed on the side from the peeling machine.

The casings of all device groups participating in the cutting process are connected to each other with aid of the guide rails 23, 24. These device groups include, in particular, the infeed aggregate 2, the front guide system 5, and the peeling machine casing 7 with the hollow shaft disposed in the peeling machine casing 7 with the cutter head 26.

The length of the guide rails 23, 24 is adapted to the length and the number of the device groups to be tightened and clamped with the preadjustment screws 66, 67. The proper bolting is performed by cylinders 28, 31, which tighten and clamp the peeling machine casing 7 to the infeed aggregate with clamping wedges 29, 32 via the closure plate 60 of the peeling machine casing 7. The clamping wedges 29 engage into breakouts 30, 33 at the guide rails 23, 24 during the setting-up of the pretensioning, preclamping, and the bolting. The pretensioning, clamping and bolting of the complete peeling machine can be easily released and disengaged by actuating the cylinders 28, 31.

The complete peeling machine 1 is clamped, tightened, and pretensioned to a block by the guide rails and their bolting. The diametrical disposition of the guide rails 23, 24 relative to the rotation axis 62 results in a good force flow and a centering of the device groups 2, 5, 63, 1 and 7, respectively, connected to each other. An additional essential advantage comprises that the complete peeling machine can be pulled apart for maintenance purposes, for repairs, or for inspection under a minimum time and material expenditure. This pulling apart can be performed selectively, wherein either only the infeed aggregate 2 is pulled back, i.e. toward right hand side in FIGS. 1 and 2, or the infeed aggregate 2 in connection with the front guide system 5, or, as a last alternative, as illustrated in FIG. 2, the infeed aggregate 2, the front guide system 5, and the device group 63 "cutter adjustment" are separated from the peeling machine casing 7. For this purpose, the recited device groups are connected to each other corresponding to the desired separation possibility, for example, by way of screws 64, 65, and the recited device groups are moved by the cylinder 34, which cylinder 34 moves the infeed aggregate 2 on rails 35, to be disposed on the foundation parallel to the guide rails 23, 24.

In particular, the possibility of access to the device group 63 "cutter adjustment" as illustrated in FIG. 2, is considered to be particularly advantageous because no hoist or similar heavy equipment would be required.

It will be understood that each of the elements described above, or two or more together, may also find a useful application in other types of peeling machines differing from the types described above.

While the invention has been illustrated and described as embodied in the context of a peeling machine for bars and tubes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A peeling machine for round stock such as bars and tubes, comprising:
    a machine frame casing;
    a rotatably driven hollow shaft defining a rotation axis having a front side;
    a rotating cutter head being disposed on an infeed front side of the hollow shaft;
    means for pulling out and withdrawing the peeled workpiece from the hollow shaft;
    an infeed first work guide assembly for the workpieces, which infeed first work guide assembly is attached to the machine frame casing and disposed on the infeed side thereof,
    wherein the infeed first work guide assembly and the machine frame casing are movable relative to each other in a direction of the rotation axis of the hollow shaft for service purposes;
    means for a disengageable and releasable tensioning and clamping together of the infeed first work guide assembly and of the machine frame casing including at least two guide rails disposed on the machine frame casing and extending parallel to the rotational axis of the cutter head.

2. The peeling machine according to claim 1, wherein the guide rail is connected to the means for the tensioning and clamping of the infeed first work guide assembly and for the machine frame casing.

3. The peeling machine according to claim 1, further comprising
    a second work guide assembly for the workpieces of round stock to be peeled and disposed between the infeed first work guide assembly and the cuter head, wherein
    the second work guide assembly is guided and movable along the guide rails in front of the cutter head.

4. The peeling machine according to claim 1, wherein the guide rails are disposed axially with respect to the rotation axis of the cutter head and intersect the diameter.

5. The peeling machine according to claim 1, further comprising
    a second work guide assembly for the workpieces of round stock to be processed and disposed between the infeed first work guide assembly and the cutter head;
    cutter adjustment means guided on said guide rails for a cutter position adjustment relative to the hollow shaft;
    a support frame for supporting internally a device group for the cutter position adjustment, wherein the support frame is inserted in a direction parallel to the rotation axis of the cutter head into the machine frame casing for the cutter head, and wherein the machine frame surrounds the cutter head and the hollow shaft carrying the cutter head.

6. The peeling machine according to claim 5, further comprising
    a second work guide assembly for the workpieces of round stock to be peeled and disposed between the infeed first work guide assembly and the cutter head;
    means for an attachment of the device group and disposed at the second work guide assembly on the infeed side of the cutter head.

7. The peeling machine according to claim 5, further comprising
    means for an attachment of the device group and disposed at the infeed first work guide assembly.

8. The peeling machine according to claim 1, further comprising
    an additional guide rail, wherein the additional guide rail is disposed parallel to the guide rails, and wherein the infeed first work guide assembly is guided at the additional guide rail.

9. The peeling machine according to claim 1, further comprising
    a drive disposed at the infeed first work guide assembly for moving the infeed first work guide assembly in the elongation direction of the guide rails.

10. The peeling machine according to claim 1, further comprising
    a second work guide assembly for the workpieces of round stock to be peeled and disposed between the infeed first work guide assembly and the cutter head;
    means for attachment of the second work guide assembly on the inlet side of the cutter head to the infeed first work guide assembly.

11. The peeling machine according to claim 1 further comprising
    a device group guided at the guide rails and subdivided in a longitudinal direction defined by the rotation axis of the cutter head;
    faces of intersection provided at the device group, wherein the faces of intersection intersect the rails.

12. A peeling machine (1) for bars (21) and tubes, comprising:
    a) an infeed first work guide assembly (2) disposed on an infeed side of the peeling machine (1).
    b) a rotating cutter head (26), c) wherein the cutter head (26) is disposed on an inlet front side of a rotatably driven hollow shaft (6), with the hollow shaft being supported by a machine frame casing (7), d) means (12) for pulling out and withdrawing a finished, peeled workpiece from the peeling machine (1), e) at least two guide rails (23, 24) supported by the casing (7) of the peeling machine (1), f) wherein the guide rails (23, 24) extend parallel to a rotation axis (62) of the cutter head (26), g) wherein the infeed first work guide assembly (2) and the peeling machine casing (7) are movable relative to each other in direction of the rotation axis (62) of the hollow shaft (6) for servicing purposes, h) means (23, 28, 29, 64) for a disengageable and releasable clamping of the infeed first work guide assembly (2) and of the peeling machine casing (7).

13. The peeling machine according to claim 12, wherein i) the guide rails (23, 24) are connected to the means (23, 28, 29, 64) for the tensioning and clamping of the infeed first work guide assembly (2) and of the peeling machine casing (7).

14. The peeling machine according to claim 12, including a second work guide assembly (5) for the bars to be peeled between the infeed first work guide assembly (2) and the cutter head (26), wherein j) the second work guide assembly (5) is guided and movable on the guide rials (23, 24) in front of the cutter head (26).

15. The peeling machine according to claim 12, wherein k) the guide rails (23, 24) are disposed about diametrically with respect to the rotation axis (62) of the cutter head (26).

16. The peeling machine according to claim 12, including a second work guide assembly for the bars to be processed between the infeed first work guide assembly (2) and the cutter head (26), wherein l) cutter adjustment means (63) are guided on guide rails (23, 24) at the hollow shaft (6), m) the cutter adjustment means (63), for the adjustment of cutters (15) are incorporated in a support frame (36), which support frame (36) is inserted in an axial direction (62) into the peeling machine casing (7) for the cutter head (26) and which support frame (36) surrounds the cutter head (26) or the hollow shaft (6) carrying the cutter head, respectively.

17. The peeling machine according to claim 12, wherein n) means (64, 65) for an attachment of a device group (63), are furnished forming a cutter adjustment, at the second work guide assembly (5) on the infeed side of the cutter head (26) or at the infeed first work guide assembly (2).

18. The peeling machine according to claim 12, wherein o) the infeed first work guide assembly (2) is guided on at least one additional guide rial (35), disposed parallel to the other guide rails (23, 24).

19. The peeling machine according to claim 12, wherein p) a drive is furnished at the infeed first work guide assembly (2) for moving the infeed first work guide assembly (2) in the direction of the guide rails (23, 24).

20. The peeling machine according to claim 14, wherein q) means (64, 65) are furnished for attachment of the second work guide assembly (5), disposed on the infeed side in front of the cutter head (26), to the infeed first work guide assembly (2).

21. The peeling machine according to claim 12, wherein r) at least one device group (5), guided at the guide rails (23, 24), is subdivided in a longitudinal direction defined by the rotation axis (62), s) the intersecting planes of the device group includes the guide rials (23).

22. The peeling machine according to claim 12, including a second work guide assembly (5) for tubes to be peeled between the infeed first work guide assembly (2) and the cutter head (26), wherein j) the second work guide assembly (5) is guided and movable on the guide rials (23, 24) in front of the cutter head (26).

23. The peeling machine according to claim 12, including a second work guide assembly for tubes to be processed between the infeed first work guide assembly (2) and the cutter head (26), wherein l) cutter adjustment means (63) are guided on guide rails (23, 24) at the hollow shaft (6), m) the cutter adjustment means (63), for the adjustment of cutters (15) are incorporated in a support frame (36), which support frame (36) is inserted in an axial direction (62) into the peeling machine casing (7) for the cutter head (26) and which support frame (36) surrounds the cutter head (26) or the hollow shaft (6) carrying the cutter head, respectively.

24. The peeling machine according to claim 14, wherein n) means (64, 65) are furnished for an attachment of the cutter adjustment means (63) at an exit side of the second work guide assembly 5.

* * * * *